Figure 1:
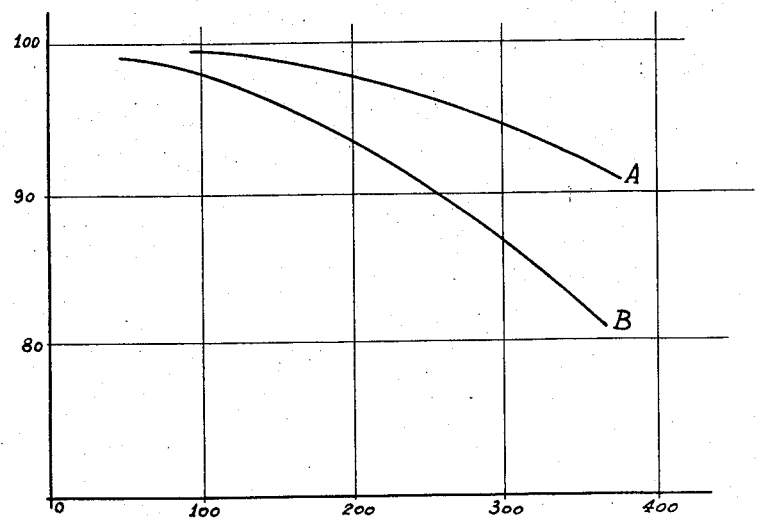

Sept. 29, 1959   J. LAFONT   2,906,603
PROCESS OF MANUFACTURE OF POTASSIUM SULPHATE
Filed June 27, 1956

INVENTOR
JAQUES LAFONT
By Hane and Nydick
ATTORNEYS

United States Patent Office 2,906,603
Patented Sept. 29, 1959

2,906,603

PROCESS OF MANUFACTURE OF POTASSIUM SULPHATE

Jacques Lafont, Saint-Gratien, France, assignor to Societe d'Etudes Chimiques pour l'Industrie et l'Agriculture, Paris, France, a company of France Application June 27, 1956, Serial No. 594,277

Claims priority, application France July 4, 1955

13 Claims. (Cl. 23—121)

This invention relates to the production of potassium sulphate. Conventional methods of producing potassium sulphate involve a double decomposition reaction between ammonium sulphate and potassium chloride in an aqueous solution. The process however is slow, the reaction is incomplete and it leads to a formation of mixed ammonium sulphate and potassium sulphate crystals necessitating a subsequent separating operation.

Various ways have been suggested to avoid such co-precipitation and obtain the potassium sulphate in isolated form. Thus, it has been sought to prevent the formation of mixed crystals by controlling the temperature and/or concentration during the reaction. However, in addition to requiring somewhat complicated operating procedures, such a method does not succeed in completely eliminating the presence of ammonium sulphate in the potassium sulphate precipitate.

Another proposed procedure has been to operate in successive stages whereby the precipitate is progressively enriched in potassium sulphate. However this entails a great number of successive steps so that it is not economically feasible on an industrial scale.

It is a general object of this invention to provide an improved method of making potassium sulphate. Specific objects are to produce potassium sulphate in isolated form, i.e. as crystals not admixed with crystals of any other unwanted substance, and to achieve this more simply, efficiently and economically than was heretofore possible.

My present invention is based on the finding that potassium sulphate will precipitate in the form of crystals unmixed with unwanted crystals, if potassium chloride is reacted in an aqueous solution with an alkyl ammonium sulphate. The alkyl ammonium sulphate used may have been obtained by any suitable process, and may advantageously comprise an alkyl ammonium sulphate obtained as a by-product in any conventional manufacturing process.

The reaction proceeds with optimum yield both in terms of the sulphate and the potassium used, when stoichiometrical proportions are used of the alkyl ammonium sulphate and the potassium chloride. If desired however, the yield in one or the other of substances may be increased by providing an excess of the other reagent in the reaction. This of course will entail a corresponding loss of the substance used in excess.

Thus the method of my invention will be readily adaptable to any particular set of economical conditions. For example, in cases where it is found advantageous to limit as far as possible the losses of potassium in the mother-liquor, the reaction will be performed in the presence of an excess of the alkyl ammonium sulphate. Conversely the sulphate yield may be improved by using an excess of the potassium chloride.

Owing to the high solubility of the alkyl ammonium salts (sulphate and chloride), the process may be conducted in a concentrated aqueous solution. 100 parts of potassium chloride may be converted with a yield higher than 98%, by means of the stoichiometrical quantity of alkyl ammonium sulphate dissolved in only 50 parts water. The feasibility of operating in concentrated solutions has the great advantage on the industrial scale of making it possible to use small-size apparatus with an excellent hourly output rate.

At the same time however the method of this invention has the further advantage of being equally operative when using much more highly dilute solutions, so that the process has great flexibility. The yield obtainable in a dilute solution will depend on the nature of the alkyl ammonium sulphate used. With alkyl ammonium sulphates leading to the least favorable results, the yields observed are always higher than 80% when the solutions used for converting 100 parts of potassium chloride contain up to 350 parts of water. On the other hand certain sulphates such as triethyl ammonium sulphate for instance are conducive to yields higher than 90% when a solution containing 350 parts of water is used for converting 100 parts of potassium chloride. These results are illustrated by the curves of Fig. 1.

Fig. 1 illustrates by way of example the variations of the potassium sulphate yield as a function of the quantity of water used for converting 100 parts of potassium chloride (i.e. 0, 100, 200 . . . parts water per 100 parts KCl) when using triethylammonium sulphate (curve A) and isopropylammonium sulphate (curve B). The tests upon which these curves are based were performed at ordinary temperature (20° C.) with amounts of alkyl ammonium sulphate corresponding to the stoichiometrical ratio on the basis of the potassium chloride.

Figure 2:
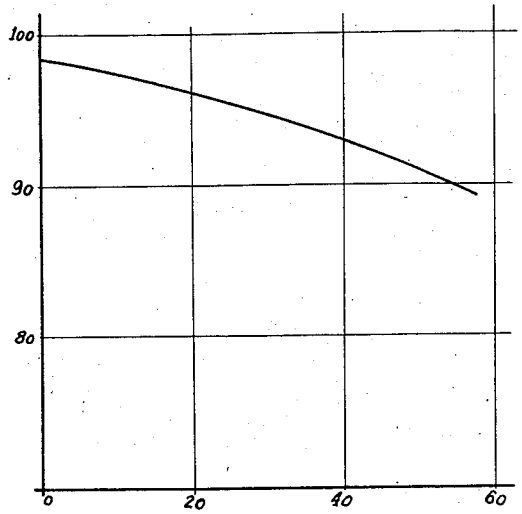

When studying the influence of temperature, it was found that the potassium sulphate yield increases slightly as the temperature is reduced. Fig. 2 illustrates for example the variations in potassium sulphate yield against temperature expressed in degree C. under the following operating conditions: 100 parts potassium chloride, 145 parts isopropylammonium sulphate and 150 parts water. It is seen from this curve that the yield can be held within the range of from 98% to 90% when operating in the temperature range of 0 to 55° C. At ordinary temperature (20° C.), that is under the most economical conditions industrially, the yield is about 96%.

The reaction results in a formation of alkyl ammonium hydrochloride and the amine may be recovered from the mother liquor by any conventional means and then delivered to a further processing stage of any desired character.

In preparing the potassium sulphate, the alkyl ammonium sulphates are preferably used of those primary, secondary or tertiary aliphatic amines having boiling points lower than 100° C., since the recovery of the amine can then be more economically achieved. The alkyl ammonium sulphates of aliphatic amines wherein the hydrocarbon radical contains from 1 to 4 carbon atoms, particularly the primary, secondary or tertiary methyl, ethyl, propyl and butyl-amines, may be used according to the invention.

Regardless of the particular alkyl ammonium sulphate used, the resulting potassium sulphate after removal of the mother liquor impregnating it is always found to be free of alkyl ammonium sulphate and of potassium chloride.

A few examples will now be given by way of illustration but not of limitation of the method of the invention. All proportions are by weight.

Example 1.—Into a solution containing 145 parts isopropylammonium sulphate and 150 parts water, 100 parts KCl are added. The mixture is agitated at ordinary temperature (about 20° C.) for one hour, and the precipitate is separated by any conventional procedure. 112 parts $K_2SO_4$ are obtained, corresponding to a conversion yield of 96%. In the mother liquor containing isopropylammonium hydrochloride, the amine is recovered by adding lime and distilling for subsequent reuse.

Example 2.—To a solution containing 285 parts water and 202 parts triethylammonium sulphate, 100 parts KCl are added, the mixture is agitated for an hour at ordinary temperature. After separation and drying there are recovered 111 parts K$_2$SO$_4$ corresponding to a conversion yield of 95%.

Example 3.—To a solution prepared from 300 parts water and 165 parts diethylammonium sulphate, 100 parts KCl are added. After one hour's agitation at ordinary temperature, 106 parts of K$_2$SO$_4$ are obtained, making a conversion yield of 91%.

Example 4.—A solution is prepared containing 104 parts water and 127 parts dimethylammonium sulphate. There are added 100 parts KCl and the mix is agitated at ordinary temperature. There are obtained 113 parts K$_2$SO$_4$, a conversion yield of 97.4%.

Example 5.—Under similar conditions as described for the foregoing examples, 100 parts KCl are reacted with a solution consisting of 188 parts water and 167 parts normal monobutylammonium sulphate. There are obtained 107 parts K$_2$SO$_4$, corresponding to a conversion yield of 92%.

All the conversion yields mentioned in the above examples are calculated on the basis of the potassium chloride used.

What I claim is:

1. A method of producing potassium sulphate which comprises reacting in an aqueous medium potassium chloride with an alkyl ammonium sulphate having the formula $$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms at a temperature not higher than about 55° C.

2. A method of producing potassium sulphate which comprises reacting in an aqueous medium potassium chloride with a methyl ammonium sulphate having from 1 to 3 methyl radicals in the methyl ammonium group at a temperature not higher than about 55° C.

3. A method of producing potassium sulphate which comprises reacting in an aqueous medium potassium chloride with an ethyl ammonium sulphate having from 1 to 3 ethyl radicals in the ethyl ammonium group at a temperature not higher than about 55° C.

4. A method of producing potassium sulphate which comprises reacting in an aqueous medium potassium chloride with a propyl ammonium sulphate having from 1 to 3 propyl radicals in the propyl ammonium group at a temperature not higher than about 55° C.

5. A method of producing potassium sulphate which comprises reacting in an aqueous medium potassium chloride with a butyl ammonium sulphate having from 1 to 3 butyl radicals in the butyl ammonium group at a temperature not higher than about 55° C.

6. A method of producing potassium sulphate which comprises reacting in an aqueous medium potassium chloride with an alkyl ammonium sulphate having the formula $$(NHRR'R'')_2SO_4$$

wherein R is an alkyl radical having from 1 to 4 carbon atoms and R' and R'' are members of the group consisting of hydrogen and alkyl radicals having from 1 to 4 carbon atoms at a temperature in the approximate range of 0°–50° C.

7. Method in accordance with claim 2 wherein the methyl ammonium sulphate is dimethyl ammonium sulphate.

8. Method in accordance with claim 3 wherein the ethyl ammonium sulphate is triethyl ammonium sulphate.

9. Method in accordance with claim 3 wherein the ethyl ammonium sulphate is diethyl ammonium sulphate.

10. Method in accordance with claim 4 wherein the propyl ammonium sulphate is isopropyl ammonium sulphate.

11. Method in accordance with claim 5 wherein the butyl ammonium sulphate is mono-n-butyl ammonium sulphate.

12. A method of producing potassium sulphate which comprises reacting 100 parts by weight of potassium chloride with an alkyl ammonium sulphate having the formula $$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms, the said alkyl ammonium sulphate being dissolved in about from 50–350 parts of water by weight at a temperature not higher than about 55° C.

13. A method of producing potassium sulphate which comprises reacting 100 parts by weight of potassium chloride with an alkyl ammonium sulphate having the formula $$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms, the said alkyl ammonium sulphate being dissolved in about from 50–350 parts of water by weight at a temperature in the approximate range of 0°–50° C.

References Cited in the file of this patent

UNITED STATES PATENTS

| 1,389,862 | Comment | Sept. 6, 1921 |

FOREIGN PATENTS

| 411,820 | Great Britain | June 8, 1934 |